US008490161B2

(12) United States Patent  
Macauley (10) Patent No.: US 8,490,161 B2  
(45) Date of Patent: Jul. 16, 2013

(54) METHODS, SYSTEMS AND COMPUTER PROGRAM PRODUCTS FOR PROVISIONING VLAN SERVICES IN A NETWORK

(75) Inventor: Daniel Warren Macauley, Fishers, IN (US)

(73) Assignee: CommScope Inc., of North Carolina, Hickory, NC (US)

( * ) Notice: Subject to any disclaimer, the term of this patent is extended or adjusted under 35 U.S.C. 154(b) by 1082 days.

(21) Appl. No.: 11/970,076

(22) Filed: Jan. 7, 2008

(65) Prior Publication Data

US 2009/0178119 A1 Jul. 9, 2009

(51) Int. Cl.
*G06F 21/00* (2006.01)

(52) U.S. Cl.
USPC ............ 726/4; 726/2; 726/3; 726/5; 726/6; 726/7; 726/8; 709/225; 709/229; 713/168; 713/169; 713/170; 713/171; 713/172; 713/173; 713/174

(58) Field of Classification Search
USPC ... 709/220–225, 229; 726/2–8; 713/168–174, 713/182–186
See application file for complete search history.

(56) References Cited

U.S. PATENT DOCUMENTS

| 5,394,503 | A |  | 2/1995 | Dietz, Jr. et al. |
|---|---|---|---|---|
| 5,978,378 | A |  | 11/1999 | Van Seters et al. |
| 6,147,995 | A |  | 11/2000 | Dobbins et al. |
| 6,222,908 | B1 |  | 4/2001 | Bartolutti et al. |
| 6,285,293 | B1 | * | 9/2001 | German et al. ............... 340/687 |
| 6,522,737 | B1 | * | 2/2003 | Bartolutti et al. ........... 379/156 |
| 6,784,802 | B1 | * | 8/2004 | Stanescu ...................... 340/687 |
| 7,193,422 | B2 |  | 3/2007 | Velleca et al. |
| 7,487,236 | B2 | * | 2/2009 | Zabihi et al. ................. 709/223 |
| 7,517,243 | B2 | * | 4/2009 | Caveney et al. ............. 439/489 |
| 8,165,014 | B2 | * | 4/2012 | Brooks et al. ................ 370/218 |
| 2003/0120763 | A1 | * | 6/2003 | Volpano ....................... 709/223 |

(Continued)

FOREIGN PATENT DOCUMENTS

| EP | 0851634 A2 | 7/1998 |
|---|---|---|
| WO | WO 98/29985 | 7/1998 |
| WO | 1480357 A2 | 11/2004 |
| WO | WO 2007/051976 A1 | 5/2007 |

OTHER PUBLICATIONS

Tony Tamaluna et. al., Walt Disney, NOn-traditional ethernet applications, Mar. 6-10, 2000, Disney.*

(Continued)

*Primary Examiner* — Taghi Arani
*Assistant Examiner* — Josnel Jeudy
(74) *Attorney, Agent, or Firm* — Myers Bigel Sibley & Sajovec, P.A.

(57) ABSTRACT

Provisioning VLAN services in a network patching system includes receiving a request to provide a VLAN service to an individual communication channel, determining whether a switch connector port connected to the individual communication channel via a patch cord is configured to provide the requested VLAN service, and initiating the requested VLAN service to the individual communication channel in response to determining that the switch connector port is configured to provide the requested VLAN service. Verification that a user associated with the individual communication channel is authorized to access the requested VLAN service may be performed prior to initiating the requested VLAN service. An administrator may be notified that a VLAN service has been requested and/or initiated. The user associated with the communication channel may be notified when the requested VLAN service has been initiated.

19 Claims, 7 Drawing Sheets

U.S. PATENT DOCUMENTS

| | | | |
|---|---|---|---|
| 2006/0160396 | A1 | 7/2006 | Macauley et al. |
| 2007/0078970 | A1 | 4/2007 | Zabihi et al. |
| 2007/0110077 | A1* | 5/2007 | Takashige et al. ....... 370/395.53 |
| 2008/0120714 | A1* | 5/2008 | Monette et al. ................. 726/11 |
| 2009/0055897 | A1* | 2/2009 | Morgan et al. .................... 726/3 |

OTHER PUBLICATIONS

Tony Tamaluna et. Al., NPL document, "Walt Disney Imagineering, Non-traditional Ethernet applications ", Mar. 6-10, 2000, Disney.*

Notification of Transmittal of the International Search Report and the Written Opinion of the International Searching Authority, or the Declaration for corresponding PCT Application No. PCT/US2008/014108 mailed Apr. 9, 2009.

First Office Action issued by the Chinese Patent Office on Nov. 29, 2012 for Chinese Patent Application No. 200880123071.3; 10 pages.

* cited by examiner

METHODS, SYSTEMS AND COMPUTER PROGRAM PRODUCTS FOR PROVISIONING VLAN SERVICES IN A NETWORK

FIELD OF THE INVENTION

The present invention relates generally to networks and, more particularly, to network patching systems.

BACKGROUND OF THE INVENTION

Many businesses, government agencies, education establishments, and other organizations have dedicated networks that enable computers, telephones, facsimile machines and the like to communicate with each other, and to communicate with devices in remote locations via a communications service provider. Conventionally, a dedicated network is hard wired using communication cables that contain conductive wires. In such hard wired systems, dedicated wires are coupled to individual service ports throughout a building, for example. The wires from the dedicated service ports conventionally extend throughout a building and into one or more closets. The communications lines from the interface hub of a main frame computer, network server or the like and the communication lines from external communication service providers may also terminate within a closet.

A network patching system is typically used to interconnect the various communication lines within a closet. In a conventional network patching system, the communication lines are terminated within a closet in an organized manner via one or more patch panels. For example, referring to FIG. 1, a typical patch panel support rack 10 is shown. The rack 10 retains a plurality of patch panels 12 that are mounted to the rack 10. On each of the patch panels 12 are located port assemblies 14. The illustrated port assemblies 14 each contain communication connector ports 16 (e.g., RJ-45 ports, RJ-11 ports, etc.). Other types of patch panels are known, including patch panels with optical fiber ports (e.g., SC, ST and LC ports) and 110-style copper wire ports.

Figure 1:
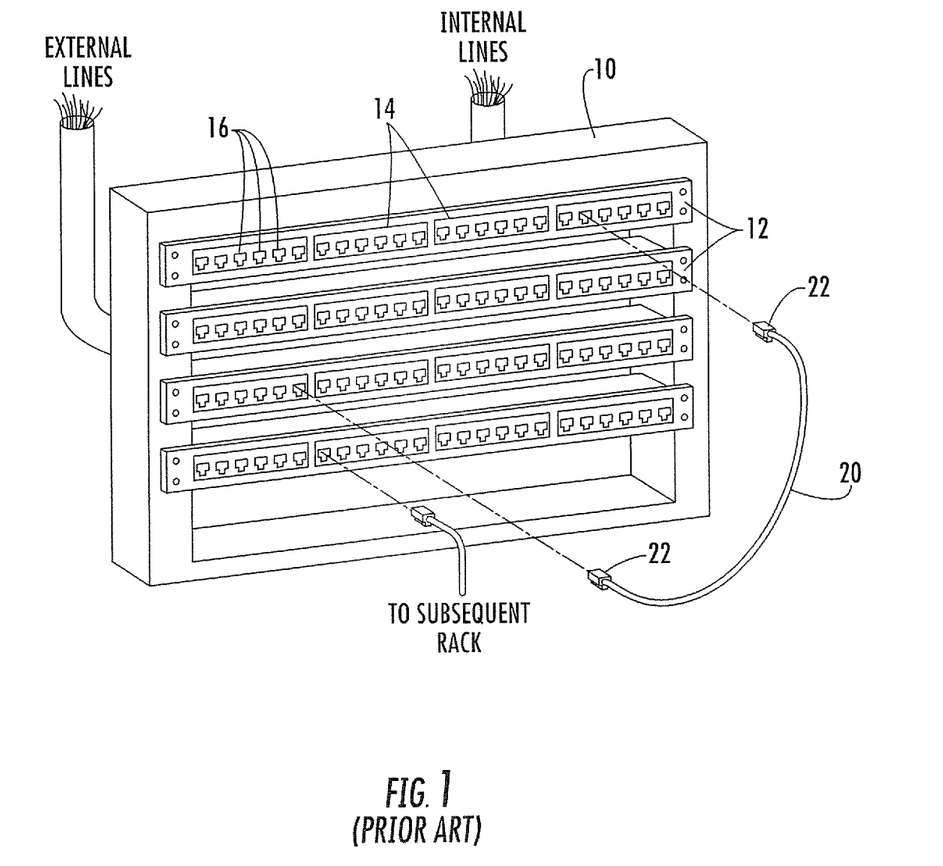
FIG. 1 is a perspective view of a typical prior art network rack assembly containing multiple patch panels with connector ports that are selectively interconnected by patch cords.

Each of the different communication connector ports 16 is hard wired to a communications line. It will be understood that a "communications line" may comprise multiple copper wires or optical fibers. For example, a conventional "communication line" to an RJ-45 connector port comprises four differential wire pairs or a total of eight wires.

Each communications line is terminated on a patch panel 12 in an organized manner. In small patch systems, all communications lines may terminate on the patch panels of the same rack. In larger patch systems, multiple racks may be used, wherein different communications lines terminate on different racks. Interconnections between the various communications lines are made using patch cords 20. Both ends of a patch cord 20 are terminated with connectors 22, such as an RJ-45 or RJ-11 or 110-style communications connector. One end of a patch cord 20 is connected to a connector port 16 of a first communications line and the opposite end of the patch cord 20 is connected to a connector port 16 of a second communications line. By selectively connecting the various communications lines with patch cords 20, any combination of communications lines can be interconnected.

In many businesses, employee computers are assigned an IP address so that the employee, via the computer, can interface with a network. When an employee changes office locations, it may not be desirable to assign a new IP address. Rather, to preserve consistency in communications, it may be preferred that the IP address previously associated with the employee be transferred to the network port(s) in the employee's new office. To accomplish this task, patch cords in a communication closet are rearranged so that the previous IP address is now associated with his/her new office.

As employees move, and/or change positions, and/or add or subtract lines, the patch cords in a typical closet may require frequent rearrangement. Network patching systems that have the ability to sense a plug in a patch panel port or sense connection between two patch panel ports are referred to as intelligent patching systems. Intelligent patching systems are described in U.S. Pat. No. 6,222,908, which is incorporated herein by reference in its entirety.

A virtual local area network (VLAN) is a local area network (LAN) with a definition that maps workstations and devices on some other basis than geographic location (for example, by department, type of user, or primary application). VLAN technology enables logical grouping of data network nodes and related data transport infrastructure to extend LANs beyond the restrictions imposed by the underlying infrastructure. A VLAN controller or switch is conventionally provided to change or add workstations/devices connected to a VLAN. An exemplary VLAN service is the provision of voice-over-internet protocol (VoIP) telephone service to selected users in an enterprise. This VLAN service can provide a predefined quality of service, a priority of service queue, etc. to users of IP phones in the enterprise.

Conventionally, when a user wishes to obtain the services provided by a particular VLAN, a network administrator or other similar person "provisions" the VLAN service to the requesting user after receiving a work order (e.g., a paper work order, electronic work order, etc.), i.e., the administrator provides the VLAN service to the user, including everything necessary to set up the service, such as equipment, wiring, patch panel connections in a closet, etc. VLAN provisioning also typically involves manually configuring a switch to provide a user with requested VLAN service. For example, in an enterprise environment, a network switch is manually reconfigured to provide a requested VLAN service to a user's LAN connection, for example in the user's office location. Moreover, a technician may be required to perform some work on the network, such as, for example, the following (a non-exhaustive list): install cabling, install patch panels, make patching changes in a closet, make changes in intermediate patching devices (e.g., consolidation points), install or move devices such as computers and/or phones, troubleshoot connection problems, configure network switches and other network equipment, etc.

As such, the provisioning of VLAN services over existing communication systems is a manual process. Moreover, many enterprise communication systems invoke manual follow-up by an administrator/technician to ensure that VLAN services have been correctly provisioned. As such, conventional provisioning of VLAN services can be time consuming and costly.

SUMMARY

In view of the above discussion, methods, systems and computer program products that allow network users to select VLAN services and have VLAN services automatically provisioned without manual intervention by a network administrator or other technician are provided. In some embodiments of the present invention, a method of provisioning VLAN services in a network patching system includes receiving a request to provide a VLAN service to an individual communication channel, determining whether a switch connector port connected to the individual communication channel via a patch cord is configured to provide the requested VLAN service, and initiating the requested VLAN service to the individual communication channel in response to determining that the switch connector port is configured to provide the requested VLAN service. Verification that a user associated with the individual communication channel is authorized to access the requested VLAN service may be performed prior to initiating the requested VLAN service. A network system administrator may be notified that a VLAN service has been requested and/or initiated for a user. In addition, the user associated with the communication channel may be notified when the requested VLAN service has been initiated.

In some embodiments of the present invention, additional VLAN switch connector ports that are configured to provide a requested VLAN service are identified and are parked such that the VLAN service cannot be accessed without authorization.

In some embodiments of the present invention, a VLAN switch is monitored for removal of a patch cord from a VLAN switch connector port. In response to detecting removal of a patch cord from a VLAN switch connector port, the switch connector port is parked such that the VLAN service cannot be accessed without authorization. A network system administrator may be notified when removal of a patch cord from a VLAN switch connector port is detected.

In some embodiments of the present invention, a VLAN switch is monitored for insertion of a patch cord in a connector port thereof. The VLAN switch connector port is automatically parked such that a VLAN service available via the switch connector port cannot be accessed without authorization. A network system administrator may be notified when insertion of a patch cord in a VLAN switch connector port is detected.

In some embodiments of the present invention, a method of provisioning VLAN services in a network patching system includes receiving a request to provide a VLAN service to an individual communication channel, determining whether a VLAN switch connector port connected to the individual communication channel via a patch cord is configured to provide the requested VLAN service, configuring the VLAN switch connector port to provide the requested VLAN service in response to determining that the switch connector port is not configured currently to provide the requested VLAN service, and initiating the requested VLAN service to the individual communication channel. Verification that a user associated with the individual communication channel is authorized to access the requested VLAN service may be performed prior to configuring a VLAN switch connector port to provide the requested VLAN service. A network system administrator may be notified that a VLAN service has been requested and/or that a VLAN switch connector port has been configured to provide a VLAN service. In addition, the user associated with the communication channel may be notified when the requested VLAN service has been initiated.

In some embodiments of the present invention, additional VLAN switch connector ports may be configured to provide a requested VLAN service. These additional connector ports may be parked such that the VLAN service cannot be accessed without authorization.

In some embodiments of the present invention, a method of provisioning VLAN services in a network patching system includes receiving a request to provide a VLAN service to an individual communication channel, determining whether a VLAN switch connector port connected to the individual communication channel via a patch cord is configured to provide the requested VLAN service, and generating a work order to configure the switch connector port to provide the requested VLAN service in response to determining that the switch connector port is not configured to provide the requested VLAN service. The VLAN switch is monitored to determine when the switch connector port has been configured to provide the requested VLAN service, and the requested VLAN service is initiated. Verification that a user associated with the individual communication channel is authorized to access the requested VLAN service may be performed prior to generating a work order. A network system administrator may be notified that a VLAN service has been requested and/or that a work order has been generated. In addition, the user associated with the communication channel may be notified when the requested VLAN service has been initiated.

In some embodiments of the present invention, a network patching system includes a patch panel having a plurality of connector ports and a VLAN switch having a plurality of connector ports. Each patch panel connector port is connected to a respective individual communication channel, and each VLAN switch connector port is configured to provide access to one or more VLAN services. One or more patch cords are configured to selectively interconnect a patch panel connector port and a VLAN switch connector port such that a respective individual communication channel can access one or more VLAN services.

In some embodiments, a patch panel includes a controller that is configured to provision VLAN services including receiving requests to provide VLAN services to individual communication channels, determining whether switch connector ports connected to individual communication channels are configured to provide the requested VLAN service, and initiating requested VLAN services to individual communication channels in response to determining that switch connector ports are configured to provide the requested VLAN service.

In some embodiments, the patch panel includes a controller that is configured to provision VLAN services including receiving a request to provide VLAN services to individual communication channels, determining whether VLAN switch connector ports connected to individual communication channels are configured to provide requested VLAN services, configuring VLAN switch connector ports that are not configured to provide requested VLAN services to provide requested VLAN services, and initiating requested VLAN services to individual communication channels.

In some embodiments, a patch panel includes a controller that is configured to provision VLAN services including receiving requests to provide VLAN services to individual communication channels, determining whether VLAN switch connector ports connected to individual communication channels are configured to provide requested VLAN services, and generating work orders to configure the VLAN switch connector ports to provide the requested VLAN service. In some embodiments, the controller is configured to monitor the VLAN switch to determine when switch connector ports have been configured to provide requested VLAN services, and then to initiate requested VLAN services.

Providing the ability to automatically select and/or configure VLAN services, according to embodiments of the present invention, can result in considerable time savings for system administrators and technicians. Moreover, managing VLAN services in accordance with embodiments of the present invention can help secure a network by removing access to VLAN services via unused connection ports and by detecting and responding to unauthorized changes to a network.

DETAILED DESCRIPTION

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," is "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first patch panel port could be termed a second patch panel port, and, similarly, a second patch panel port could be termed a first patch panel port without departing from the teachings of the disclosure.

The present invention may be embodied as systems, methods, and/or computer program products for provisioning VLAN services in a patch panel system. Patch panel systems according to some embodiments of the present invention may include the manual use of patch cords, as illustrated in FIG. 1. Patch panel systems according to other embodiments of the present invention may include automatic patching capabilities, such as auto cross connections, etc. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
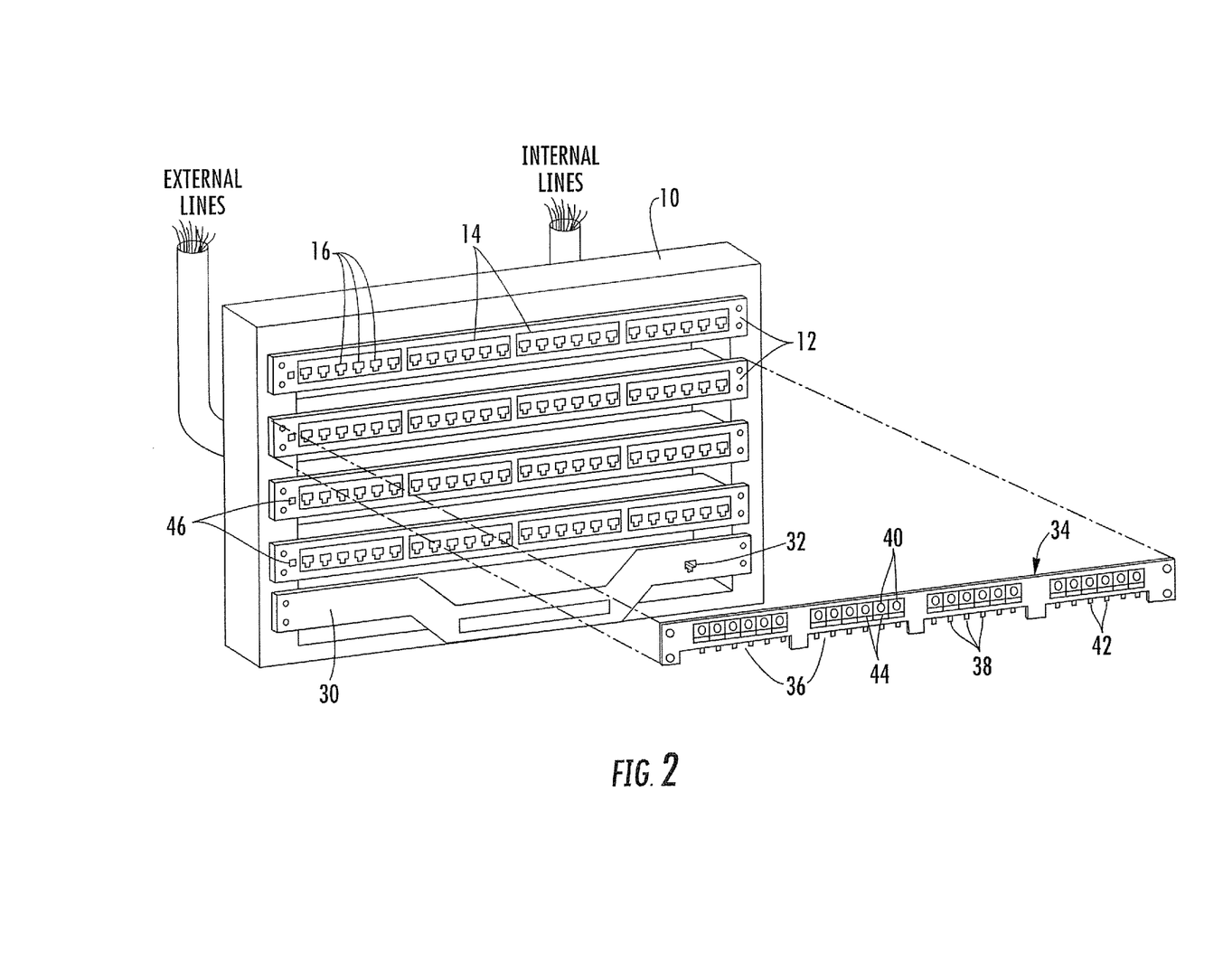
FIG. 2 is a perspective view of a network patching system rack assembly that includes a plurality of patch panels, a tracing interface module, and a controller configured to implement embodiments of the present invention.

Embodiments of the present invention may be (but are not required to be) utilized with network patching systems capable of detecting patch cord insertions and removals. An exemplary patching system having the capability of detecting patch cord insertions and removals is illustrated in FIG. 2. The illustrated telecommunications rack 10 contains a plurality of patch panels 12, and each of the patch panels 12 contain a plurality of port assemblies 14. However, it is understood that patch panels utilized in embodiments of the present invention may include a plurality of connector ports 16 and need no be grouped as port assemblies. Embodiments of the present invention are not limited to the illustrated patch panels of FIG. 2.

The connector ports 16 are hard wired to incoming external lines or incoming internal lines, as described above with respect to FIG. 1. A controller 30 is mounted to, or otherwise associated with, each rack 10. In some embodiments of the present invention, the controller 30 contains a central processing unit (CPU) that is configured to execute software that implements embodiments of the present invention. Embodiments of the present invention are not limited to the illustrated configuration, however. Another device located remote from the patch panels may include a controller configured to execute software for implementing embodiments of the present is invention. For example, a device (e.g., server, etc.) executing system management software for a communication system/patch panel system may be utilized to implement embodiments of the present invention. The use of the term "controller" is intended to include any device capable of executing software for implementing embodiments of the present invention and is not limited to the illustrated controller 30.

In the illustrated embodiment, a tracing interface module 34 mounts to the face of each patch panel 12 on the rack 10. The tracing interface modules 34 surround the various connector ports 16 located on patch panels 12 and provide an interface through which data about each connector port 16 can be transmitted to and from the controller 30. A tracing interface module 34 may have any of various configurations and may even be built into a patch panel (i.e., need not be an externally mounted apparatus on a patch panel).

The illustrated tracing interface module 34 includes a plurality of sensors 38, wherein each sensor 38 corresponds in position with one of the connector ports 16 on the patch panel 12. As the terminated end of a patch cord 20 (FIG. 1) is connected to, or removed from, a connector port 16, the presence or absence of the patch cord is detected by the controller 30 (or other device) via a respective sensor 38, as would be understood by one skilled in the art of the present invention. The controller 30 (or other device) is therefore capable of automatically determining when a patch cord has been added or removed from any connector port 16 on the rack 10. In some embodiments a sensor 38 may be utilized to detect patch cord insertion and removal from more than one connector port 16.

In addition to the sensors 38, the illustrated tracing interface module 34 includes light emitting diodes (LEDs) 40 and tracing buttons 44. An LED 40 and tracing button 44 are provided for each connector port 16 when the tracing interface module 34 is connected to the patch panel 12. Accordingly, each connector port 16 on the patch panel 12 has an LED 40 and tracing button 44 that corresponds in position to that connector port 16. The controller 30 is connected to all the LEDs 40, trace buttons 44 and sensors 38 on all of the trace interface modules 34.

When a patch cord 20 (FIG. 1) is placed into any connector port 16 (FIG. 2), or removed from any connector port 16, that change is sensed by a sensor 38 and is read to the controller 30 (or other device). The controller 30 (or other device) is therefore capable of monitoring any and all changes that occur with respect to the patch cords in the patch system over time. The controller 30 (or other device) is therefore also capable of automatically keeping an accurate log of all changes that have occurred with respect to the patch cords since the installation of the system. Accordingly, if a technician is servicing the patch system, that technician can read the accurate log straight from the controller 30 (or other device).

In addition to keeping an accurate log of all physical patch cord changes, the end points of any patch cord 20 (FIG. 1) can be accurately traced. For instance, suppose a technician wants to find the opposite end of a particular patch cord. That technician can press the trace button 44 that corresponds in position to the known end of the patch cord. Upon the pressing of the trace button 44, the controller 30 (or other device) will review its log and determine where the opposite end of that patch cord is located. The controller 30 (or other device) will then light the LED 40 that corresponds in position to the opposite end of the targeted patch cord. The technician then need only look for the lit LED 40 on one of the tracing interface modules 34 to find the opposite end of the targeted patch cord. According to embodiments of the present invention, the controller 30 (or other device) is also configured to provision Virtual Local Area Network (VLAN) services in the patching system, as will be described below with respect to FIGS. 3-7. According to embodiments of the present invention, a VLAN can be displayed via a user interface associated with controller 30 or other device.

Figure 3:
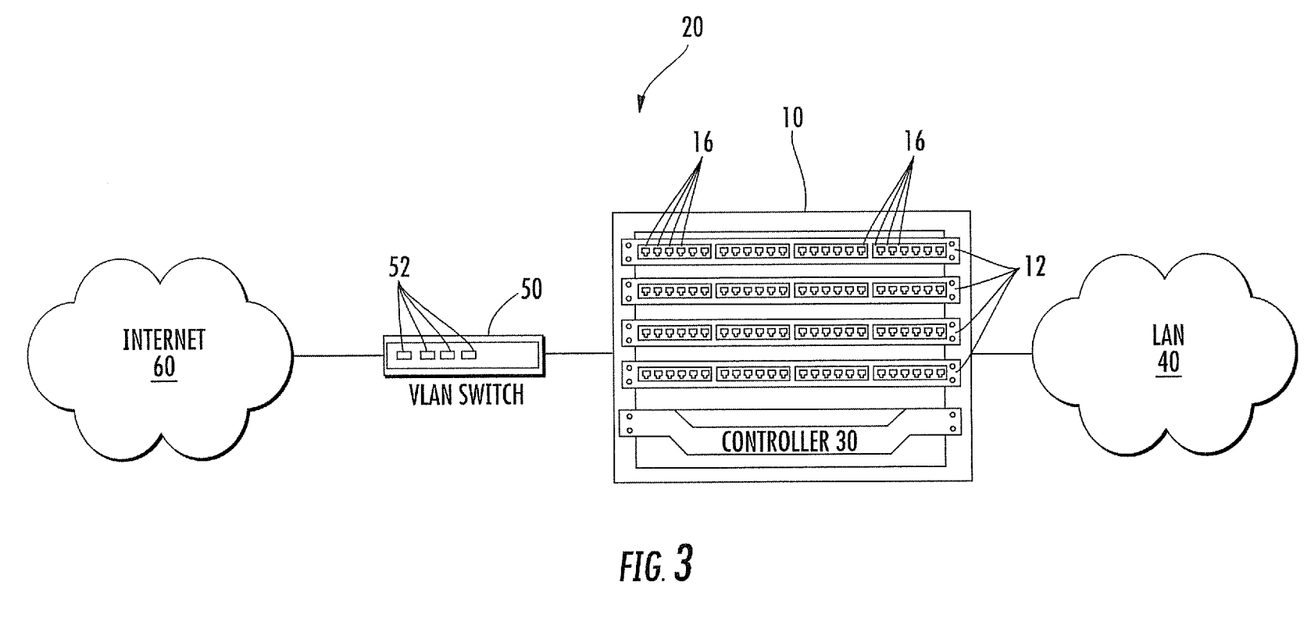
FIG. 3 is a block diagram that illustrates a network patching system with automatic VLAN service provisioning, according to embodiments of the present invention.

Referring to FIG. 3, a network patching system 20 is illustrated that includes a rack 10 of patch panels 12, each having a plurality of connector ports 16. Each patch panel connector port 16 is connected to a respective individual communication channel in a local area network (LAN) 40. As would be understood by those skilled in the art, a LAN is a system of personal computers, work stations, terminals and/or devices that are interconnected via a building's structured voice and/or data wiring to form a network that permits groups of people to work together.

The term "individual communication channel" means the structured wiring from a patch panel connector 16 to a particular device or jack connected to the LAN. The terms "individual communication channel" and "communications line" as used and defined herein are interchangeable.

The illustrated network patching system 20 also includes a VLAN switch (or other network device) 50 that has a plurality of connector ports 52. Each VLAN switch connector port 52 is configured to provide access to one or more VLAN services obtainable via an external network such as, for example, the internet 60. An exemplary VLAN service is voice over internet protocol (VoIP) telephone service. One or more patch cords (not illustrated) are configured to selectively interconnect a respective patch panel connector port 16 and a VLAN switch connector port 52 such that a respective individual communication channel can access one or more VLAN services. The illustrated VLAN switch 50 may be any type of network equipment that can be connected to a patch panel and through which access can be obtained to one or more VLAN services.

The illustrated rack assembly 10 includes a controller 30 that is configured to provision VLAN services, according to embodiments of the present invention. In some embodiments, the controller 30 is configured, for example, to receive requests to provide VLAN services to individual communication channels, determine whether switch connector ports connected to individual communication channels are configured to provide the requested VLAN services, and initiate requested VLAN services to individual communication channels in response to determining that switch connector ports are configured to provide the requested VLAN service. In some embodiments, the controller 30 is configured, for example, to receive requests to provide VLAN services to individual communication channels, determine whether VLAN switch connector ports connected to individual communication channels are configured to provide requested VLAN services, configure VLAN switch connector ports that are not configured to provide requested VLAN services to provide requested VLAN services, and initiate requested VLAN services to individual communication channels. In other embodiments, the controller 30 is configured to receive requests to provide VLAN services to individual communication channels, determine whether VLAN switch connector ports connected to individual communication channels are configured to provide requested VLAN services, and generate work orders to configure the VLAN switch connector ports to provide the requested VLAN service.

Figure 4:
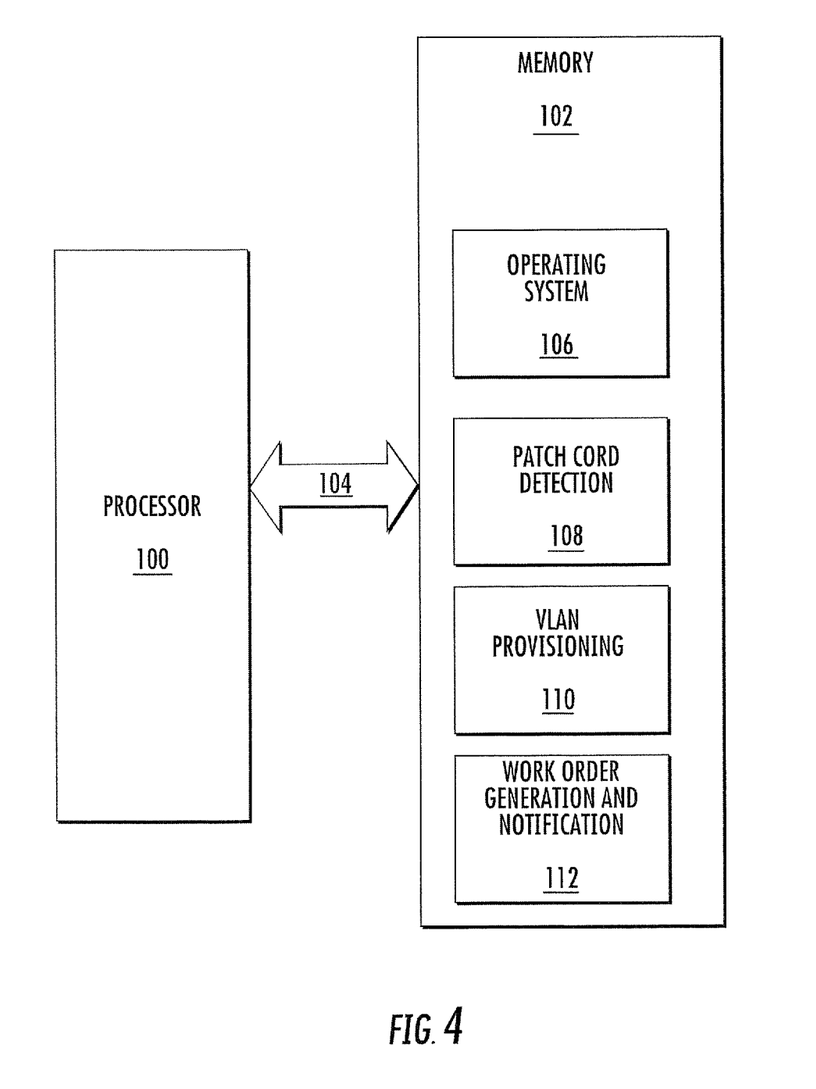
FIG. 4 is a block diagram that illustrates a software architecture for provisioning VLAN services, in accordance with some embodiments of the present invention.

FIG. 4 illustrates a processor 100 and a memory 102 hosted by the controller 30 (or other device) that may be used in embodiments of methods, systems, and computer program products according to the present invention. For example, in some embodiments of the present invention, the processor 100 and memory 102 may be used to embody the processors and the memories used in provisioning VLAN services, detecting patch cord insertions/removals, and generating work orders to configure VLAN switch connector ports. The processor 100 communicates with the memory 102 via an address/data bus 104. The processor 100 may be, for example, a commercially available or custom microprocessor. The memory 102 is representative of the overall hierarchy of memory devices containing the software and data used to provision VLAN services, detect patch cord insertions/removals, and generate work orders, in accordance with some embodiments of the present invention. The memory 102 may include, but is not limited to, the following types of devices: cache, ROM, PROM, EPROM, EEPROM, flash, SRAM, and DRAM.

As shown in FIG. 4, the memory 102 may hold four or more major categories of software and data: an operating system 106, a patch cord detection module 108, a VLAN service provisioning module 110, and a work order generation and notification module 112. The operating system 106 controls operations of the controller 30. In particular, the operating system 106 may manage the controller's resources and may coordinate execution of programs by the processor 100.

The patch cord detection module 108 comprises logic for detecting patch cord insertions and removals from connector ports 16 in the patch panels 12 as well as connector ports 52 in the VLAN switch. In some embodiments, the patch cord detection module 108 comprises logic for parking VLAN switch connector ports when an unauthorized patch cord is inserted therein and/or an authorized patch cord is removed therefrom.

The VLAN service provisioning module 110 comprises logic for receiving requests to provide VLAN services to an individual communication channel, determining whether a switch connector port connected to the individual communication channel via a patch cord is configured to provide the requested VLAN service, and initiating the requested VLAN service to the individual communication channel in response to determining that the switch connector port is configured to provide the requested VLAN service. In some embodiments, the VLAN service provisioning module 110 comprises logic for identifying additional switch connector ports that are configured to provide the requested VLAN service, and parking any identified switch connector ports that are configured to provide the requested VLAN service such that the VLAN service cannot be accessed without authorization.

In some embodiments, the VLAN service provisioning module 110 comprises logic for verifying that a user associated with the individual communication channel is authorized to access the requested VLAN service. In some embodiments, the VLAN service provisioning module 110 comprises logic for notifying a user and/or an administrator (or other technician/person) that a requested VLAN service has been initiated for a user associated with an individual communication channel. The term "administrator" as used herein shall include technicians and other persons responsible for network system management.

The work order generation and notification module 112 comprises logic for generating work orders to configure VLAN switch connector ports to provide a requested VLAN service. In some embodiments, the work order generation and notification module 112 comprises logic for notifying a technician or technician group upon the generation of a work order.

Although FIG. 4 illustrates an exemplary software architecture that may facilitate provisioning VLAN services, detecting patch cord insertions/removals, and generating work orders to configure VLAN switch connector ports, it will be understood that the present invention is not limited to such a configuration but is intended to encompass any configuration capable of carrying out the operations described herein. Embodiments of the present invention can be integrated into management software utilized by intelligent patching systems.

Computer program code for carrying out operations of the controller 30 (or other device) discussed above with respect to FIG. 4 may be is written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

The present invention will now be described herein with reference to flowchart and/or block diagram illustrations of methods, systems, and computer program products for provisioning VLAN services in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions are provided to a processor of a patch panel controller, or other programmable data processing apparatus associated with a patch panel system, to produce a machine, such that the instructions, which execute via the processor and create means for implementing the functions specified in the flowchart and/or block diagram block or blocks.

These computer program instructions may also be stored in a computer usable or computer-readable memory that may direct a patch panel system controller to function in a particular manner, such that the instructions stored in the computer usable or computer-readable memory produce an article of manufacture including instructions that implement the function specified in the flowchart and/or block diagram block or blocks.

The computer program instructions may also be loaded onto a patch panel system controller or other programmable data processing apparatus to cause a series of operational steps to be performed on the controller or other programmable apparatus to produce a computer implemented process such that the instructions that execute on the controller or other programmable apparatus provide steps for implementing the functions specified in the flowchart and/or block diagram block or blocks.

Figure 5:
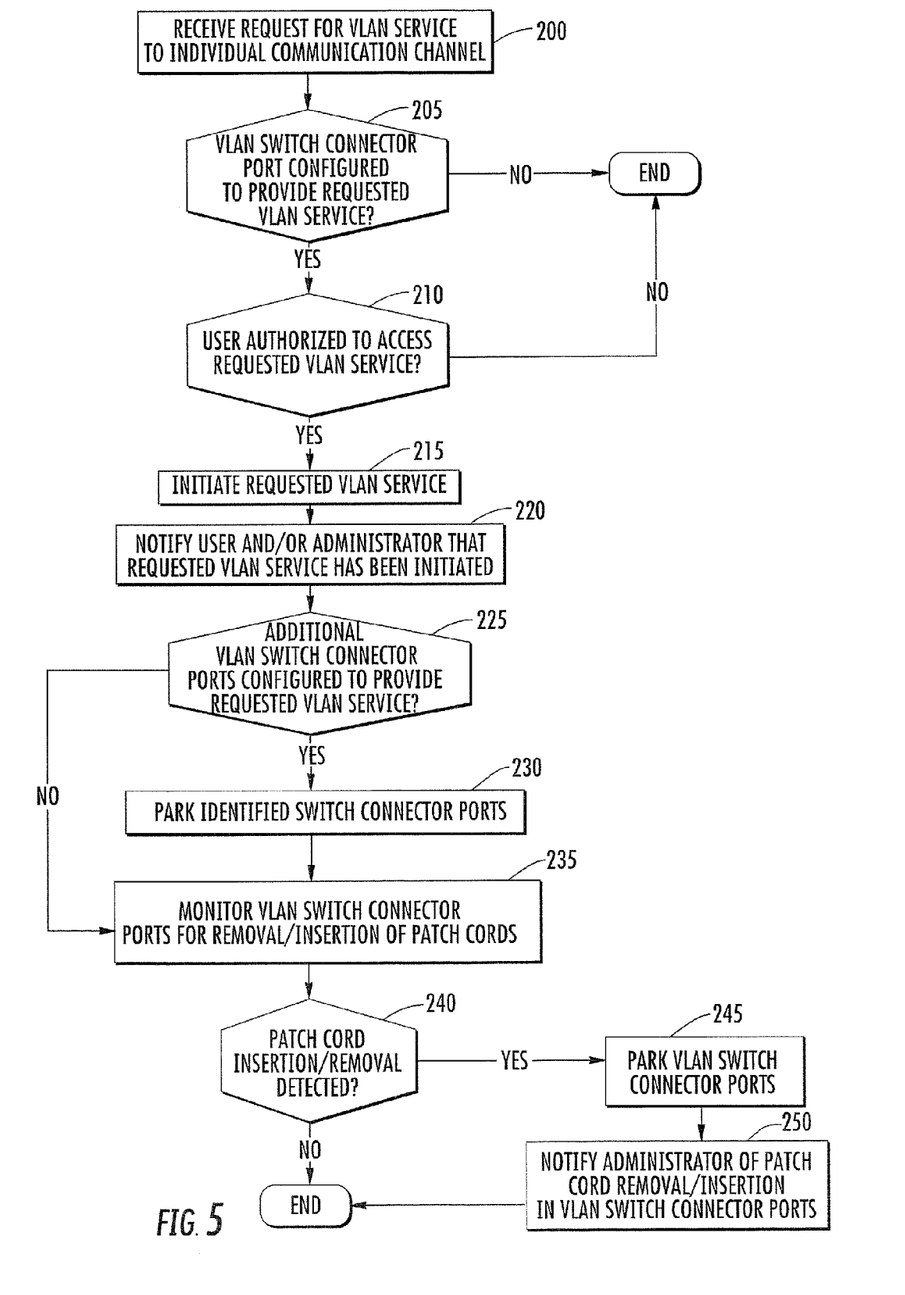
FIGS. 5-7 are flowcharts of operations for provisioning VLAN services, in accordance with various embodiments of the present invention.
Figure 6:
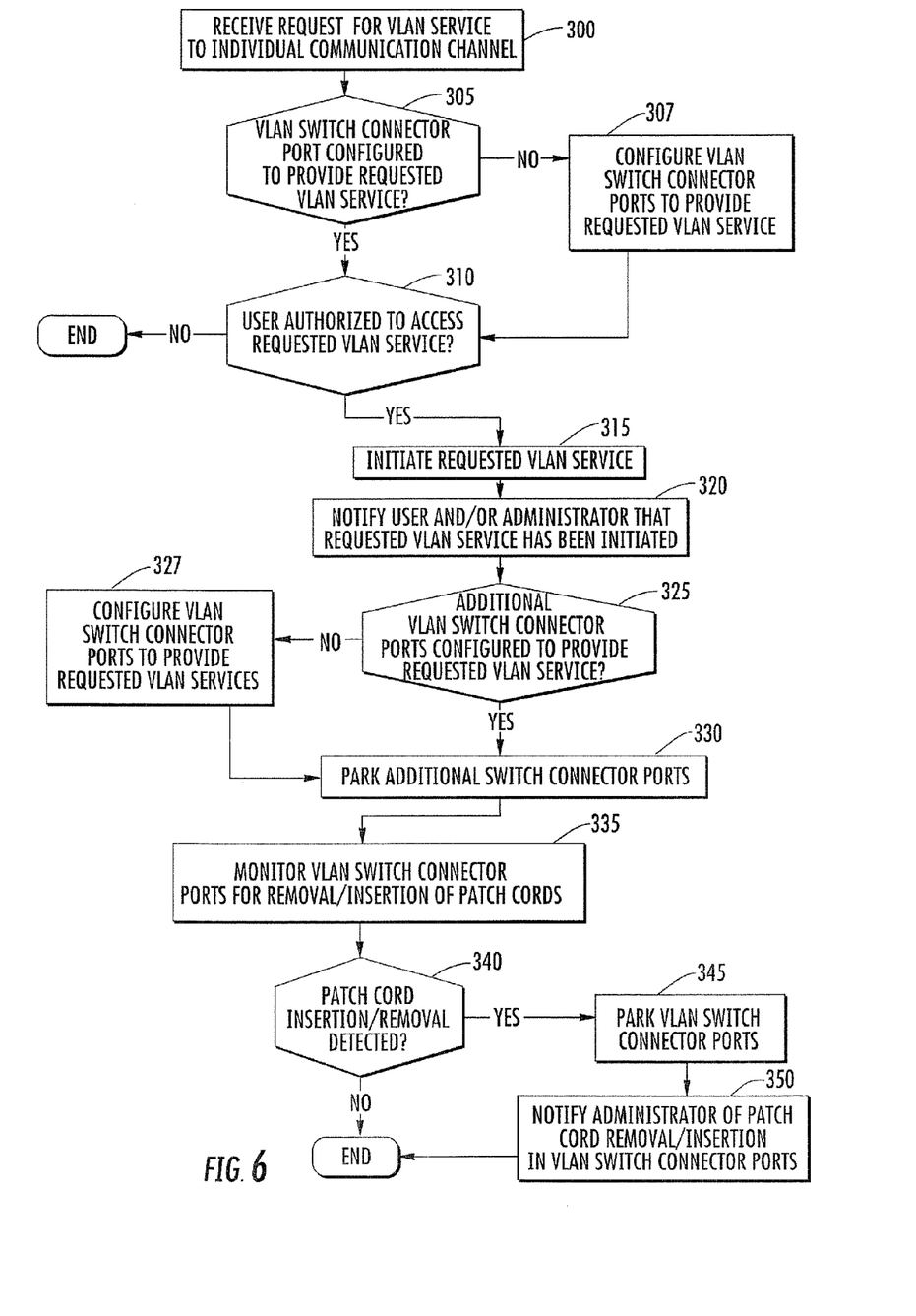
Figure 7:
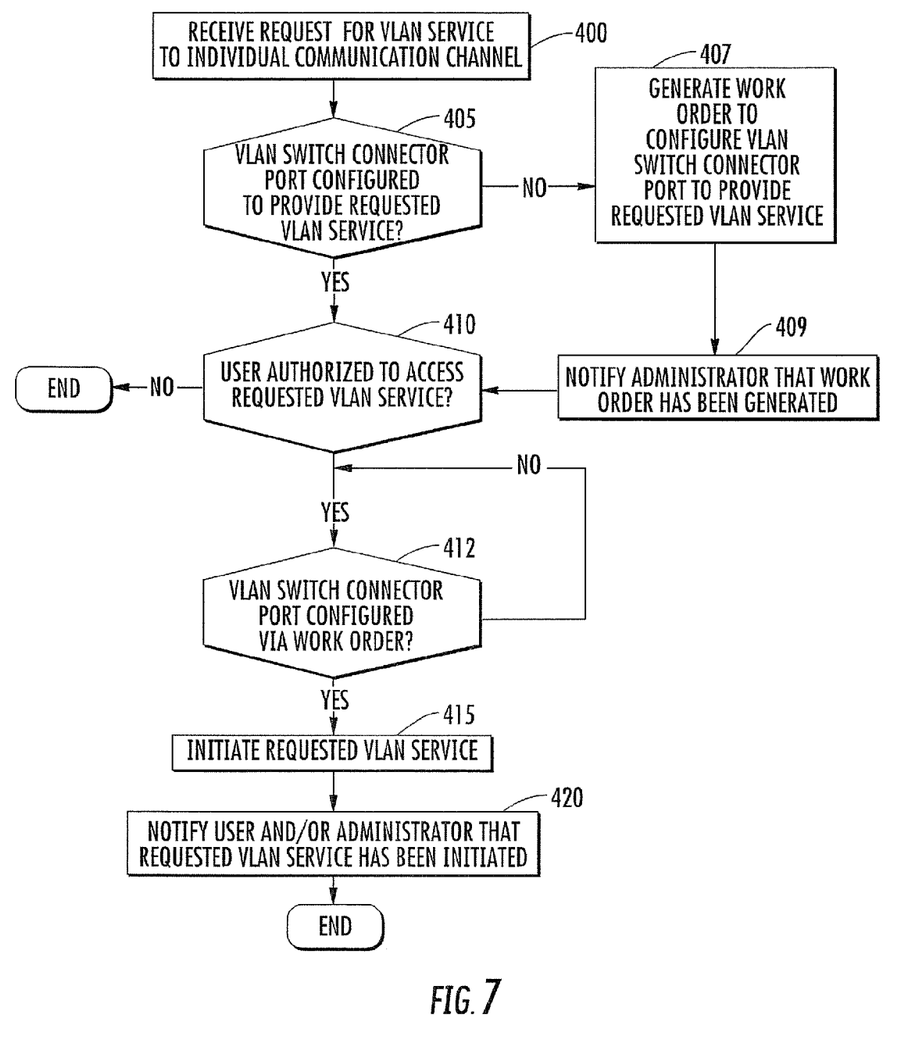

The flowcharts of FIGS. 5-7 illustrate the architecture, functionality, and operations of embodiments of methods, systems, and computer program products for provisioning VLAN services. In this regard, each block in the flowcharts may represent a module, segment, or portion of code, which comprises one or more executable instructions for implementing the specified logical function(s). It should also be noted that in other implementations, the function(s) noted in the blocks may occur out of the order described with respect to FIGS. 5-7. Moreover, one or more blocks in a respective flowchart illustrated in FIGS. 5-7 may occur independently of other blocks in a respective flowchart. For example, operations represented by Blocks 200-220 of FIG. 5 may occur independently of operations represented by Blocks 225-230. Operations represented by Blocks 235-250 of FIG. 5 may occur independently of operations represented by Blocks 200-220 and Blocks 225-230, etc.

Referring now to FIG. 5, a method of provisioning VLAN services in a network patching system, according to some embodiments of the present invention, is illustrated. A request to provide a VLAN service to an individual communication channel is initially received by a patching system (Block 200). This request can originate from a user associated with the communication channel and/or a system administrator (or other technician/person). A determination is made whether a VLAN switch connector port connected to the individual communication channel via a patch cord is configured to provide the requested VLAN service (Block 205). Operations at Block 205 may also include determining if certain business/security rules of the patching system can be followed by providing the requested VLAN service. If the answer is no, operations terminate. Alternatively, if the user is authorized to access the requested VLAN service and other network business/security rules are satisfied, the VLAN service could be provisioned.

If the answer is yes, a determination is made whether a user associated with the individual communication channel is authorized to access the requested VLAN service (Block 210). If the answer is yes, the requested VLAN service is initiated to the individual communication channel (Block 215). If the answer is no, operations terminate. In some embodiments, a user associated with the individual communication channel and/or a system administrator (or other technician/person) are notified that the requested VLAN service has been initiated (Block 220). Notification may be accomplished in any of various ways. For example, an electronic message can be transmitted to a user and/or an administrator via cell phone, pager, wrist watch, PDA, computer, etc. Notification can be immediately upon the initiation of the VLAN service or can be performed subsequent in time.

A determination may be made if additional VLAN switch connector ports are configured to provide the requested VLAN service (Block 225). If the answer is no, operations continue as described below at Block 235. If the answer is yes, any additional VLAN switch connector ports are "parked" such that the VLAN service cannot be accessed without authorization (Block 230). The term "parked" means that the connector ports are essentially disabled and cannot be used to access the VLAN service without authorization. Port parking is an advantageous security feature of embodiments of the present invention. Unused VLAN switch ports configured to provide access to VLAN services can be automatically identified and access to them can be blocked automatically without intervention by an administrator or technician.

Operations represented by Blocks 225-230 of FIG. 5 may occur independently of operations represented by Blocks 200-220. For example, identification of VLAN switch connector ports that are configured to provide VLAN services can occur independently of requests for VLAN services. Moreover, operations represented by Blocks 225-230 of FIG. 5 may occur independently of operations represented by Blocks 235-250, discussed below. For example, the detection of patch cord insertion and removal and the subsequent parking of a connector port can occur independently of requests for VLAN services and independently of identification of VLAN switch connector ports that are configured to provide VLAN services.

Still referring to FIG. 5, the VLAN switch may be monitored for patch cord removal from connector ports and/or patch cord insertion within connector ports (Block 235). If removal and/or insertion of a patch cord is detected, a VLAN switch connector port associated with the removal/insertion is parked such that VLAN services via the connector ports cannot be accessed without authorization (Block 245). A system administrator may be notified that a patch cord has been removed from a VLAN switch connector port and/or that a patch cord has been inserted within a VLAN switch connector port (Block 250). Notification may be accomplished in any of various ways. For example, an electronic message can be transmitted to an administrator via cell phone, pager, wrist watch, PDA, computer, etc. Notification can be immediately upon the detection that a patch cord has been removed from a VLAN switch connector port and/or that a patch cord has been inserted within a VLAN switch connector port, or can be performed subsequent in time.

Referring now to FIG. 6, a method of provisioning VLAN services in a network patching system, according to other embodiments of the present invention, is illustrated. A request to provide a VLAN service to an individual communication channel is initially received by a patching system (Block 300). This request can originate from a user associated with the communication channel and/or a system administrator (or other technician/person). A determination is made whether a VLAN switch connector port connected to the individual communication channel via a patch cord is configured to provide the requested VLAN service (Block 305). If the answer is no, the VLAN switch connector port is automatically configured to provide the requested VLAN service (Block 307). This may be accomplished, for example, by the controller 30 being configured to write to the VLAN switch so as to configure the VLAN switch connector ports.

After the VLAN switch connector port has been configured, or if the VLAN switch connector port is already configured, a determination is made whether a user associated with the individual communication channel is authorized to access the requested VLAN service (Block 310). If the answer is yes, the requested VLAN service is initiated to the individual communication channel (Block 315). If the answer is no, operations terminate. In some embodiments, a user associated with the individual communication channel and/or a system administrator (or other technician/person) are notified that the requested VLAN service has been initiated (Block 320).

A determination may be made if additional VLAN switch connector ports are configured to provide the requested VLAN service (Block 325). If the answer is no, one or more additional VLAN switch connector ports may be configured to provide the requested VLAN service for future use (Block 327). The additionally configured VLAN switch connector ports are then parked such that the VLAN service cannot be accessed without authorization (Block 330). This feature is particularly advantageous because future configuration of additional VLAN switch connector ports to provide a VLAN service will not be necessary. When needed to provide access to a VLAN service, and when authorized, these connector ports can be easily and quickly unparked and made ready for use.

Embodiments of the present invention have the capability of provisioning multiple requests for VLAN services at the same time. Operations represented by FIGS. 5-7 are not limited to provisioning/monitoring a single VLAN service at a time.

Operations represented by Blocks 325-330 of FIG. 6 may occur independently of operations represented by Blocks 300-320. For example, identification of VLAN switch connector ports that are configured to provide VLAN services can occur independently of requests for VLAN services. Moreover, operations represented by Blocks 325-330 of FIG. 6 may occur independently of operations represented by Blocks 335-350, discussed below. For example, the detection of patch cord insertion and removal and the subsequent parking of a connector port can occur independently of requests for VLAN services and independently of identification of VLAN switch connector ports that are configured to provide VLAN services.

Still referring to FIG. 6, the VLAN switch may be monitored for patch cord removal from connector ports and/or patch cord insertion within connector ports (Block 335). If removal and/or insertion of a patch cord is detected, a VLAN switch connector port associated with the removal/insertion is parked such that VLAN services via the connector ports cannot be accessed without authorization (Block 345). A system administrator (or other technician/person) may be notified that a patch cord has been removed from a VLAN switch connector port and/or that a patch cord has been inserted within a VLAN switch connector port (Block 350).

Referring now to FIG. 7, a method of provisioning VLAN services in a network patching system, according to other embodiments of the present invention, is illustrated. A request to provide a VLAN service to an individual communication channel is initially received by a patching system (Block 400). This request can originate from a user associated with the communication channel and/or a system administrator. A determination is made whether a VLAN switch connector port connected to the individual communication channel via a patch cord is configured to provide the requested VLAN service (Block 405). If the answer is no, a work order is generated that requests the VLAN switch connector port be configured to provide the requested VLAN service (Block 407). In some embodiments, if there are existing parked ports configured to provide the VLAN service, these ports can be reclaimed for use.

A system administrator may be notified that a work order has been generated (Block 409). Notification may be accomplished in any of various ways. For example, an electronic message can be transmitted to an administrator via cell phone, pager, wrist watch, PDA, computer, etc. Notification can be immediately upon generation of a work order or can be performed subsequent in time.

As would be known to those skilled in the art of the present invention, a work order is a list of activities required to connect one or more devices to a communication/data network or required to provide one or more network services. Activities include, but are not limited to, port configuration, installing network equipment, installing patch panels, installing outlets, cabling outlets to panels, adding/removing/moving patch cords, adding/removing/moving devices such as computers and phones, making changes to a communication/data network on passive connecting hardware (e.g., connecting hardware, consolidation points, panels, etc.).

After generation of the work order, a determination is made whether a user associated with the individual communication channel is authorized to access the requested VLAN service (Block 410). If the answer is yes, a determination is made whether the VLAN switch connector port has been configured to provide the requested VLAN service pursuant to the generated work order (Block 412). If the answer is no, operations do not proceed and the controller 30 awaits acknowledgement that the VLAN switch is connector port has been configured to provide the requested VLAN service. If the answer is yes, the requested VLAN service is initiated to the individual communication channel (Block 415). In some embodiments, a user associated with the individual communication channel and/or a system administrator (or other technician/person) are notified that the requested VLAN service has been initiated (Block 420).

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of provisioning Virtual Local Area Network (VLAN) services in a network patching system the method comprising:
receiving a request to provide a VLAN service to an individual communication channel in a network patching system, wherein the network patching system includes a patch panel having a plurality of connector ports that are connected to respective individual communication channels, a switch having a plurality of connector ports that are configured to provide access to one or more services, one or more patch cords that are each configured to selectively connect one of the patch panel connector ports and one of the switch connector ports such that a respective individual communication channel can access one or more services;
determining whether a switch connector port connected to the individual communication channel via a patch cord is configured to provide the VLAN service; and
initiating the VLAN service to the individual communication channel in response to determining that the switch connector port is configured to provide the VLAN service;
wherein receiving the request to provide the VLAN service to an individual communication channel, determining whether a switch connector port connected to the individual communication channel via a patch cord is configured to provide the VLAN service, and initiating the VLAN service to the individual communication channel in response to determining that the switch connector port is configured to provide the VLAN service are performed by at least one processor, and wherein the at least one processor monitors changes that occur with respect to the one or more patch cords in the patching system over time.

2. The method of claim 1, further comprising:
identifying via the at least one processor additional switch connector ports that are configured to provide the VLAN service; and
parking via the at least one processor any identified additional switch connector ports that are configured to provide the VLAN service such that the VLAN service cannot be accessed without authorization.

3. The method of claim 1, further comprising verifying via the at least one processor that a user associated with the individual communication channel is authorized to access the VLAN service.

4. The method of claim 1, further comprising notifying via the at least one processor an administrator that the VLAN service has been initiated for a user associated with the individual communication channel, and/or notifying a user associated with the individual communication channel that the VLAN service has been initiated.

5. The method of claim 1, further comprising:
monitoring for insertion of another patch cord in a switch connector port; and
parking via the at least one processor the switch connector port such that the VLAN service cannot be accessed without authorization in response to detecting insertion of another patch cord in the switch connector port.

6. The method of claim 5, further comprising notifying via the at least one processor an administrator that insertion of another patch cord in the switch connector port has been detected.

7. The method of claim 1, further comprising configuring via the at least one processor the switch connector port to provide the VLAN service in response to determining that the switch connector port is not configured currently to provide the VLAN service.

8. The method of claim 7, further comprising:
configuring via the at least one processor one or more additional switch connector ports to provide the VLAN service; and parking via the at least one processor the one or more additional switch connector ports such that the VLAN service cannot be accessed without authorization.

9. A method of provisioning Virtual Local Area Network (VLAN) services in a network patching system the method comprising:

receiving a request to provide a VLAN service to an individual communication channel in a network patching system, wherein the network patching system includes a patch panel having a plurality of connector ports that are connected to respective individual communication channels, a switch having a plurality of connector ports that are configured to provide access to one or more services, one or more patch cords that are each configured to selectively connect one of the patch panel connector ports and one of the switch connector ports such that a respective individual communication channel can access one or more services;

determining whether a switch connector port connected to the individual communication channel via a patch cord is configured to provide the VLAN service; and generating a work order to configure the switch connector port to provide the VLAN service in response to determining that the switch connector port is not configured to provide the VLAN service;

wherein receiving the request to provide the VLAN service to an individual communication channel, determining whether a switch connector port connected to the individual communication channel via a patch cord is configured to provide the VLAN service, and generating a work order to configure the switch connector port to provide the VLAN service in response to determining that the switch connector port is not configured to provide the VLAN service are performed by at least one processor.

10. The method of claim 9, further comprising notifying via the at least one processor an administrator that a work order has been generated.

11. The method of claim 9, further comprising verifying via the at least one processor that a user associated with the individual communication channel is authorized to access the VLAN service.

12. The method of claim 9, further comprising notifying via the at least one processor an administrator that the VLAN service has been initiated for a user associated with the individual communication channel, and/or notifying a user associated with the individual communication channel that the VLAN service has been initiated.

13. A computer program product for provisioning Virtual Local Area Network (VLAN) services in a network patching system, comprising:

a non-transitory computer readable storage medium having computer readable program code embodied therein, the computer readable program code being configured to be executed by the at least one processor to carry out the method of claim 1.

14. A computer program product for provisioning Virtual Local Area Network (VLAN) services in a network patching system, comprising:

a non-transitory computer readable storage medium having computer readable program code embodied therein, the computer readable program code being configured to be executed by the at least one processor to carry out the method of claim 9.

15. The method of claim 1, further comprising:

monitoring via the at least one processor for removal of the patch cord from the switch connector port; and parking via the at least one processor the switch connector port such that the VLAN service cannot be accessed without authorization in response to detecting removal of the patch cord from the switch connector port.

16. The method of claim 15, further comprising notifying via the at least one processor an administrator that removal of the patch cord from the switch connector port has been detected.

17. The method of claim 9, further comprising:

determining via the at least one processor when the switch connector port has been configured to provide the requested VLAN service; and initiating via the at least one processor the VLAN service to the individual communication channel in response to determining that the switch connector port is configured to provide the requested VLAN service.

18. The method of claim 1, wherein the at least one processor is a processor of a device that is remote from the patch panel that executes system management software.

19. The method of claim 18, wherein the at least one processor further includes a processor of a controller that is associated with a rack on which the patch panel is mounted.

* * * * *

UNITED STATES PATENT AND TRADEMARK OFFICE
CERTIFICATE OF CORRECTION

PATENT NO.        : 8,490,161 B2                                Page 1 of 1
APPLICATION NO.   : 11/970076
DATED             : July 16, 2013
INVENTOR(S)       : Macauley It is certified that error appears in the above-identified patent and that said Letters Patent is hereby corrected as shown below:

On Title Page:
Item (56) References Cited, Foreign Patent Documents:
    Please correct "WO 1480357 A2 11/2004"
        to read -- EP 1480357 A2 11/2004 --

Signed and Sealed this
Eighteenth Day of February, 2014

Michelle K. Lee
*Deputy Director of the United States Patent and Trademark Office*